(12) United States Patent
Raikin et al.

(10) Patent No.: US 9,424,198 B2
(45) Date of Patent: Aug. 23, 2016

(54) METHOD, SYSTEM AND APPARATUS INCLUDING LOGIC TO MANAGE MULTIPLE MEMORIES AS A UNIFIED EXCLUSIVE MEMORY

(71) Applicant: Intel Corporation, Santa Clara, CA (US)

(72) Inventors: Shlomo Raikin, Ofer (IL); Zvika Greenfield, Kfar Sava (IL)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/691,107

(22) Filed: Nov. 30, 2012

(65) Prior Publication Data

US 2014/0156935 A1    Jun. 5, 2014

(51) Int. Cl.
*G06F 12/08* (2016.01)
*G06F 12/06* (2006.01)

(52) U.S. Cl.
CPC ........ *G06F 12/0893* (2013.01); *G06F 12/0646* (2013.01); *G06F 12/0864* (2013.01); *G06F 12/0888* (2013.01); *G06F 2212/15* (2013.01)

(58) Field of Classification Search
CPC ............ G06F 12/0646; G06F 12/0846; G06F 12/0864; G06F 12/0888; G06F 12/0893; G06F 2212/15
See application file for complete search history.

(56) References Cited

U.S. PATENT DOCUMENTS

| | | | | |
|---|---|---|---|---|
| 5,564,035 | A | * | 10/1996 | Lai ................................ 711/144 |
| 5,687,131 | A | * | 11/1997 | Spaderna ............ G06F 12/0802 365/189.07 |
| 6,516,387 | B1 | * | 2/2003 | Auracher ............ G06F 12/0864 711/123 |
| 6,535,958 | B1 | * | 3/2003 | Fuoco et al. .................. 711/122 |
| 2010/0161907 | A1 | * | 6/2010 | Santhanakrishnan et al. ............................. 711/146 |
| 2010/0169894 | A1 | * | 7/2010 | Sheaffer et al. ............... 718/106 |
| 2012/0079200 | A1 | * | 3/2012 | Dally ............................. 711/119 |
| 2012/0166891 | A1 | * | 6/2012 | Dahlen et al. .................... 714/54 |
| 2013/0268728 | A1 | * | 10/2013 | Ramanujan et al. .......... 711/105 |

* cited by examiner

*Primary Examiner* — Mark Giardino, Jr.
*Assistant Examiner* — Glenn Gossage
(74) *Attorney, Agent, or Firm* — Trop, Pruner & Hu, P.C.

(57) ABSTRACT

A processor includes at least one execution unit, a near memory, and memory management logic to manage the near memory and a far memory external to the processor as a unified exclusive memory. Each of a plurality of data blocks may be exclusively stored in either the far memory or the near memory. The unified exclusive memory space may be divided into a plurality of sets and a plurality of ways. In response to a request for a first block stored in the far memory, the memory management logic may move the first block from the far memory to the near memory, and may move a second block from the near memory to the far memory. A tag buffer may store tags associated with blocks being moved between the near memory and the far memory. Fill and drain buffers may also be used. Other implementations are described and claimed.

19 Claims, 10 Drawing Sheets

FIG. 1A

| Way 1 | Way 2 | ... | Way N-1 | Way N |
|---|---|---|---|---|
| $MD_1$ | ⋮ | ⋮ | ⋮ | ⋮ |
| $MD_2$ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| $MD_Z$ | ⋮ | ⋮ | ⋮ | ⋮ |

METHOD, SYSTEM AND APPARATUS INCLUDING LOGIC TO MANAGE MULTIPLE MEMORIES AS A UNIFIED EXCLUSIVE MEMORY

BACKGROUND

Embodiments relate generally to computer memory.

Conventionally, computing devices include a central processor and main memory (e.g., random-access memory external to the processor). The processor may read data and instructions from the main memory, and may write execution results to the main memory. Some processors may include internal processor memory (i.e., located within the processor package) for use as cache memory.

Generally, the cache memory stores copies of data blocks that are also stored in the main memory, and that may be required by the processor in the near future. Thus, in the event that the cached data blocks are required by the processor, these data blocks do not have to transferred from the main memory. In this manner, the cache memory may enable faster and/or more efficient execution by the processor.

DETAILED DESCRIPTION

In accordance with some embodiments, internal processor memory and main memory may be managed as a unified memory space. Within the unified memory space, each data block is exclusively stored in either the internal processor memory or the main memory. In some embodiments, when a first data block stored in the main memory is accessed, the first data block may be moved to the internal processor memory. Specifically, in some embodiments, the first data block may swap locations with a second data block previously stored in the internal processor memory. By combining the internal processor memory and main memory in such a manner, the total available memory may be larger than that available in conventional systems.

Figure 1A:
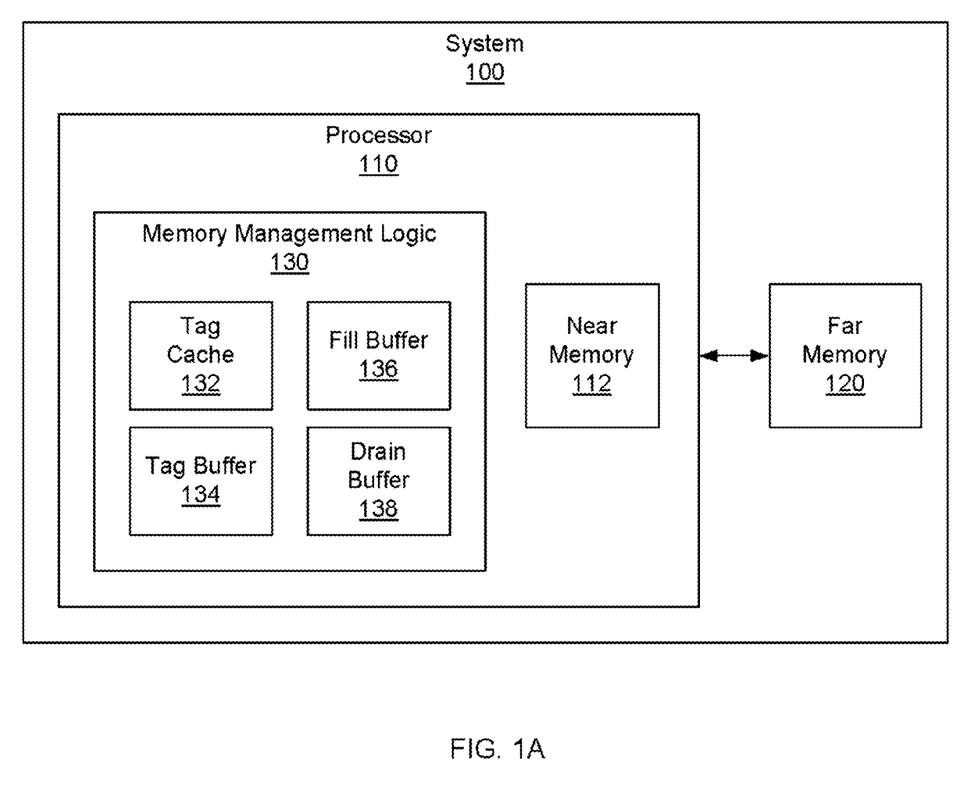
FIG. 1A is a block diagram of a system in accordance with one or more embodiments.

Referring to FIG. 1A, shown is a block diagram of a system 100 in accordance with one or more embodiments. As shown in FIG. 1A, the system 100 may include a processor 110 coupled to a far memory 120. As used herein, the term "far memory" refers to computer memory that is external to the processor 110. For example, the far memory 120 may be one or more random-access memory (RAM) modules mounted on a computer motherboard. In accordance with some embodiments, the system 100 may be all or a portion of any electronic device, such as a cellular telephone, a computer, a server, a media player, a network device, etc.

As shown, in one or more embodiments, the processor 110 may include memory management logic 130 and near memory 112. As used herein, the term "near memory" refers to computer memory that is internal and/or integral to the processor 110. For example, the near memory 112 may be memory circuits located within the package of processor 110, such as static random-access memory (SRAM), embedded dynamic random-access memory (DRAM), etc. In some embodiments, the memory management logic 130 may include a tag cache 132, a tag buffer 134, a fill buffer 136, and a drain buffer 138. The functionality of these components is described below with reference to FIG. 2.

In accordance with some embodiments, the memory management logic 130 may provide functionality to manage the near memory 112 and the far memory 120 as a unified exclusive memory. As used herein, the term "unified exclusive memory" refers to a memory architecture in which the near memory 112 and the far memory 120 together form a single memory address space. In one or more embodiments, this unified exclusive memory space may be divided into multiple storage locations, with each location having a unique memory address. Note that a data block having a particular memory address is only stored in a single location within the unified exclusive memory. Thus, in contrast to a conventional memory system, the near memory 112 does not store cached copies of data blocks that are also stored in the far memory 120.

In one or more embodiments, the storage locations of the unified exclusive memory may be arranged in groups referred to as "ways." Further, in some embodiments, the near memory 112 may include a first portion of the ways, and the far memory 120 may include a remaining portion of the ways.

In some embodiments, the unified exclusive memory space may be further arranged in sets. For example, each set may include one or more locations from each way. In one or more embodiments, each storage location is associated with a unique tag. The tag may be all or a portion of the memory address for the storage location. For example, in some embodiments, each memory address may include a tag portion, a set portion, and an offset portion. In one or more embodiments, the offset portion may specify an offset within a given storage location, a particular byte within a data block, etc. One example using sets and ways is described below with reference to FIGS. 1B-1C.

In one or more embodiments, the memory management logic 130 may include functionality to receive requests for data blocks from the processor 110 (e.g., for executing a program). In response to such a request, the memory management logic 130 may determine the storage location of the requested data block within the near memory 112 or the far memory 120, and may then read the requested data block from the determined storage location.

In some embodiments, if the determined storage location is in the far memory 120, the memory management logic 130 may optionally move the requested data block to a new storage location in the near memory 112. Further, if a second data block is already stored in the new storage location in the near memory 112, the second data block may then be moved to the determined storage location in the far memory 120. Stated differently, the storage locations of the requested data block and the second data block may swapped. In some embodiments, such location swaps may enable the most recently-used data blocks to be located within the processor 110, and may thus result in faster execution and/or lower power consumption.

In one or more embodiments, a location swap may be performed using temporary buffers to temporarily store each data block during its respective move. For example, in some embodiments, the fill buffer 136 may store a requested data block during a transfer from a first location (e.g., the determined storage location in the far memory 120) to a second location (e.g., the new storage location in the near memory 112). Further, the drain buffer 138 may store a second data block (i.e., a data block swapped with the requested data block) during a transfer from the second location in the near memory 112 to the first location in the far memory 120. The functionality of the fill buffer 136 and the drain buffer 138 is described further below with reference to FIG. 3B.

In some embodiments, the tag cache 132 may store the tags associated with all data blocks stored in the near memory 112. Further, in some embodiments, the entries of the tag cache 132 may be arranged to match the sets and ways of the near memory 112. Accordingly, if a particular tag is included in the tag cache 132, the set and way position in which the tag is located within the tag cache 132 may be used to determine the storage location (i.e., the set and way of the near memory 112) of the data block associated with that particular tag. In one or more embodiments, the tag buffer 134 may temporarily store the tags associated with any data blocks being moved and/or swapped between the near memory 112 and the far memory 120.

Figure 1B:
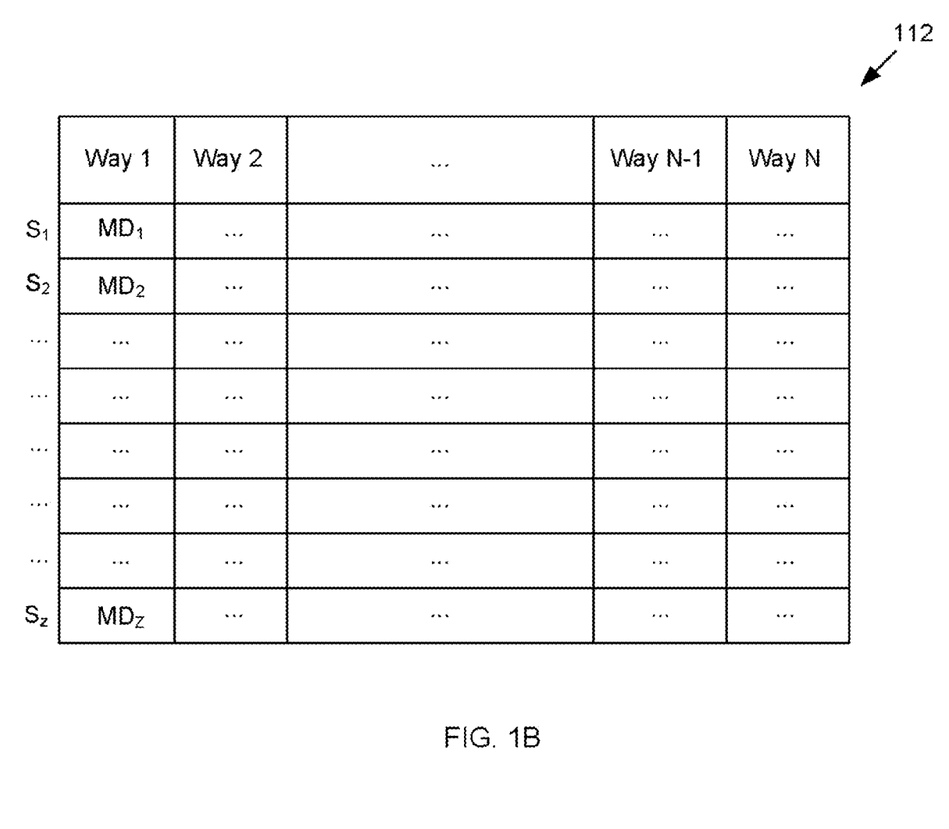
FIGS. 1B-1C together illustrate an example of a unified exclusive memory comprised of a near memory and a far memory, and which includes W ways and Z sets, in accordance with one or more embodiments.
Figure 1C:
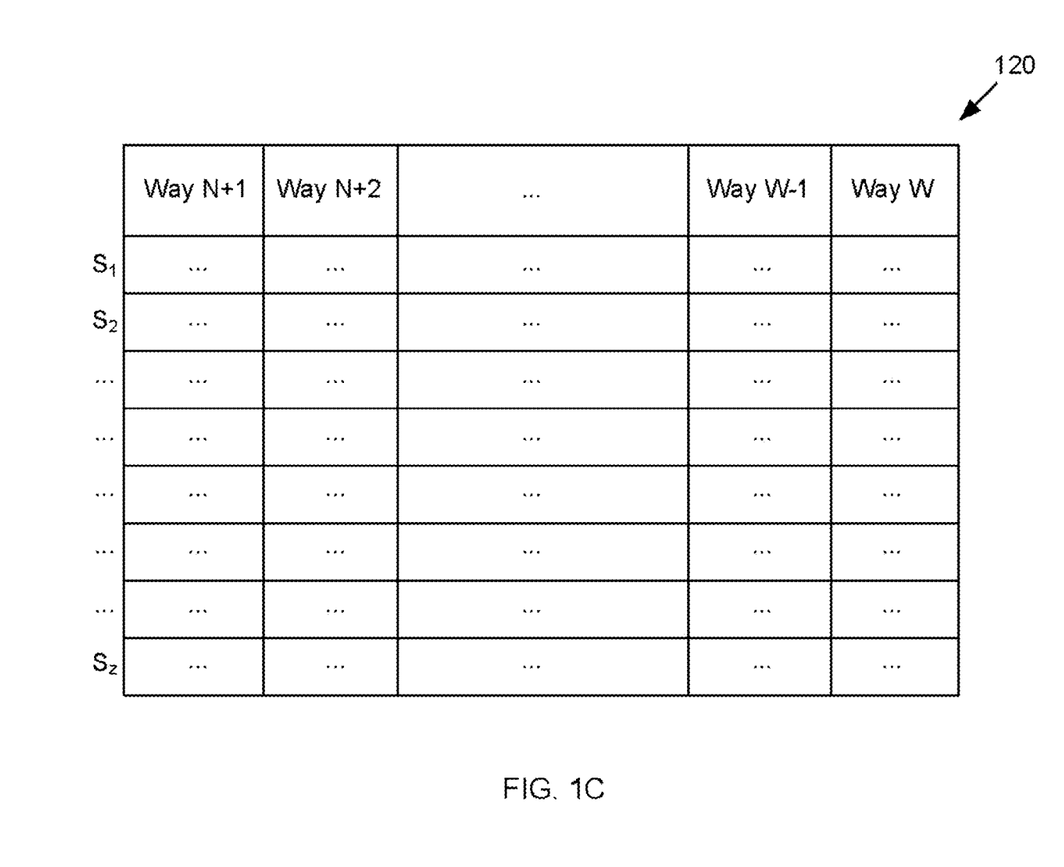

FIGS. 1B-1C illustrate an example in which the unified exclusive memory (i.e., the near memory 112 and the far memory 120) includes W ways and Z sets. As shown in FIG. 1B, in this example, the near memory 112 includes the first N ways (i.e., ways 1 to N) of the unified exclusive memory. Further, in this example, the near memory 112 includes Z sets (i.e., sets $S_1$ to $S_Z$).

Referring now to FIG. 1C, the far memory 120 includes the remaining ways (i.e., ways N+1 to W) of the unified exclusive memory. Further, the far memory 120 also includes the same Z sets (i.e., sets $S_1$ to $S_Z$) as the near memory 112.

In one or more embodiments, the first way of near memory 112 (i.e., the way having the lowest way address) may store metadata describing the data blocks stored in the remaining ways of the near memory 112 and the far memory 120. For example, referring to FIGS. 1B-1C, way 1 includes metadata entries $MD_1$ to $MD_Z$, corresponding to sets 1 to Z. In some embodiments, each metadata entry MD may include W−1 tags (not shown) corresponding to ways 2 to W. Thus, by matching a particular tag to the tags included in the metadata entries MD, the storage location (i.e., the set and way of the near memory 112 or the far memory 120) of the data block associated with that particular tag may be determined.

In one or more embodiments, the metadata entries MD may also include one or more flag bits to indicate additional information about each storage location. For example, in some embodiments, each metadata entry MD may include a least recently used (LRU) flag bit and/or a most recently used (MRU) flag bit corresponding to each storage location. Note that, while FIGS. 1B-1C depict sets and ways as columns and rows, these examples are merely provided for the sake of illustration. As such, the scope of the various embodiments discussed herein is not limited in this regard.

Figure 2:
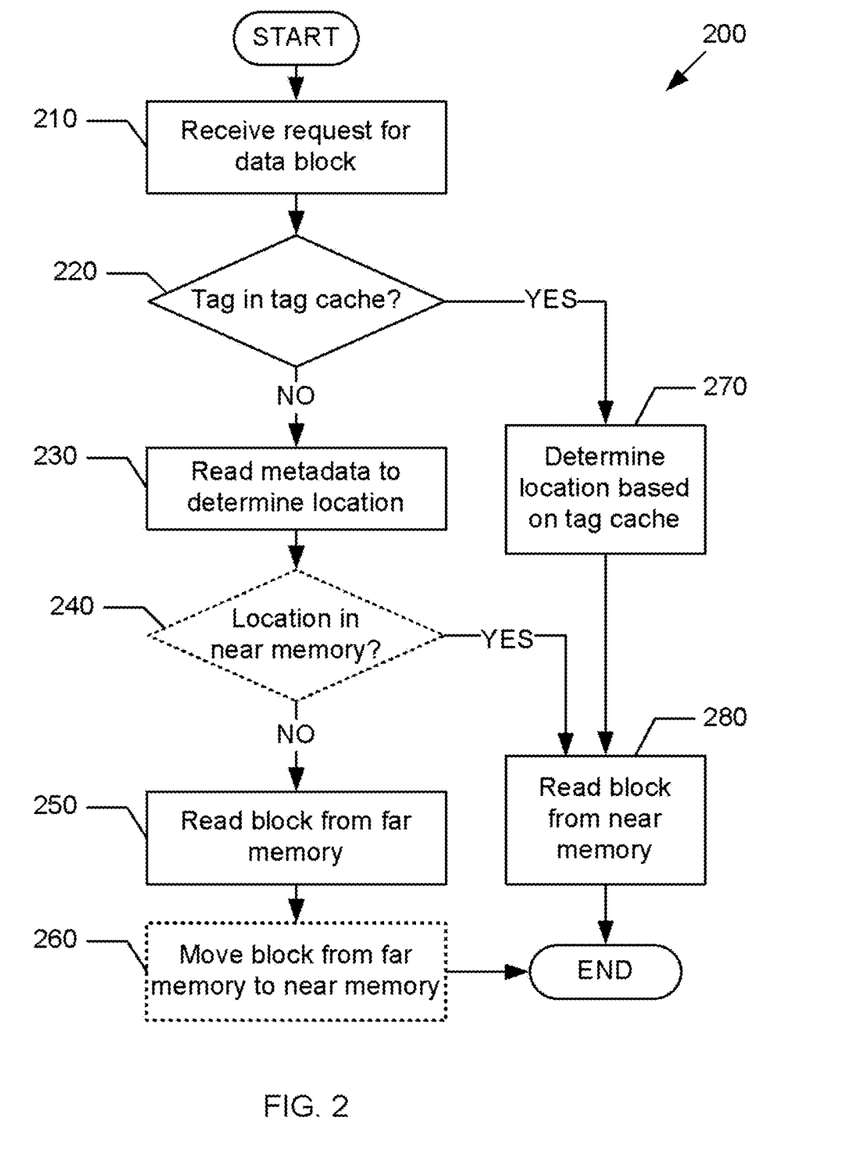
FIG. 2 is a sequence for reading a data block in accordance with one or more embodiments.

Referring now to FIG. 2, shown is a sequence 200 for reading a data block, in accordance with one or more embodiments. In one or more embodiments, the sequence 200 may be part of the memory management logic 130 shown in FIG. 1A. The sequence 200 may be implemented in hardware, software, and/or firmware. In firmware and software embodiments it may be implemented by computer executed instructions stored in a non-transitory computer readable medium, such as an optical, semiconductor, or magnetic storage device.

At step 210, a request for a first data block may be received. For example, referring to FIG. 1A, the memory management logic 130 may receive a request for a particular data block.

At step 220, a determination is made about whether a tag associated with the first data block is stored in a tag cache. For example, referring to FIG. 1A, the memory management logic 130 may determine whether the tag cache 132 includes a tag associated with the first data block. In one or more embodiments, the tag cache 132 includes the tag if the first data block is stored in the near memory 112.

If it is determined at step 220 that the tag associated with the first data block is stored in a tag cache, then at step 270, the location of the first data block may be determined based on the tag cache. For example, referring to FIG. 1A, the set and way position of the tag within the tag cache 132 may be used to determine the storage location of the first data block within the near memory 112.

At step 280, the first data block may be read from the storage location within the near memory. For example, referring to FIG. 1A, the first data block is read from the storage location in the near memory 112. After step 280, the sequence 200 ends.

However, if it is determined at step 220 that the tag associated with the first data block is not stored in a tag cache, then at step 230, metadata may be read to determine the storage location of the first data block. For example, referring to FIG. 1B, the tag associated with the first data block may be compared or matched to the metadata entries MD1 to MDZ (stored in way 1 of the near memory 112) in order to determine the storage location (e.g., the set and way) of the first data block.

At step 240, a determination about whether the first data block is stored in the near memory may be made. For example, referring to FIG. 1A, the memory management logic 130 may determine whether the storage location of the first data block is included in the near memory 112. As described above with reference to step 230, in some embodiments, the storage location of the first data block may be determined based on the metadata entries $MD_1$ to $MD_Z$ shown in FIG. 1B.

In some embodiments, step 240 may be optionally performed if the tag cache cannot be used to definitively determine whether the first data block is stored in the near memory. For example, referring to FIG. 1A, step 240 may be performed if the tag cache 132 is incomplete (i.e., does not include tags for all data blocks in near memory), or if a tag cache is not used at all (i.e., if steps 220 and 270 are skipped or omitted).

If it is determined at step 240 that the first data block is stored in the near memory, then at step 280, the first data block may be read from the storage location within the near memory (determined at step 230). For example, referring to FIG. 1A, the first data block is read from the storage location in the near memory 112. After step 280, the sequence 200 ends.

However, if it is determined at step 240 that the first data block is not stored in the near memory, then at step 250, the first data block may be read from the storage location within the far memory (determined at step 230). For example, referring to FIG. 1A, the first data block is read from the storage location in the far memory 120.

At step 260, the first data block may optionally be moved from the far memory 120 to the near memory 112. Specifically, in some embodiments, step 260 may be performed if it is desired that the most recently-used data block is always stored in the near memory 112. However, it is contemplated that step 260 may be selectively performed based on different heuristics. For example, in some embodiments, step 260 may be performed only when the data block is requested by a particular agent (e.g., a graphics program). In another example, step 260 may be performed only for a predefined percentage of requested data blocks (e.g., 40 percent, 50 percent, etc.). An example expansion of step 260 is discussed in greater detail below with reference to FIGS. 3A-3B. After step 260, the sequence 200 ends.

Figure 3A:
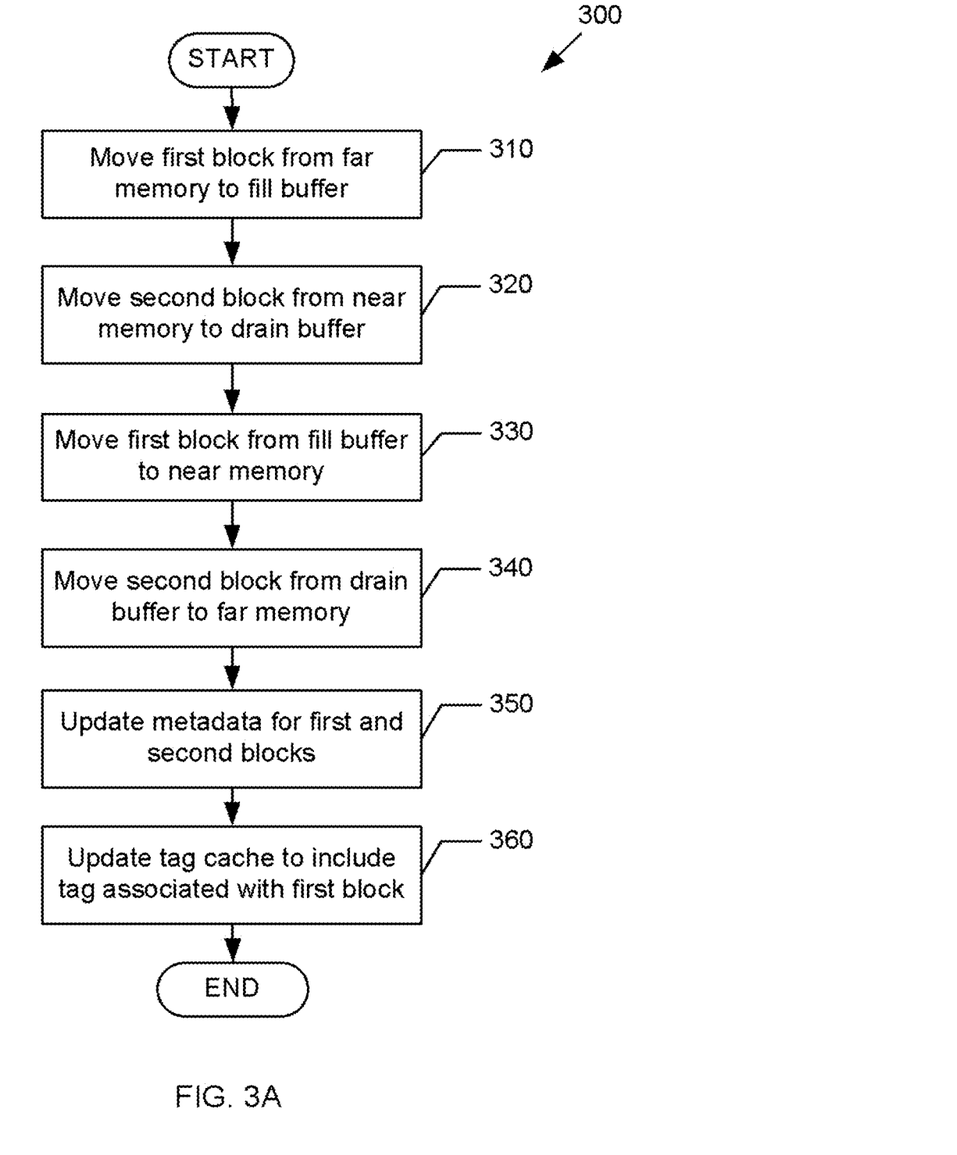
FIG. 3A is a sequence for moving a data block in accordance with one or more embodiments.

Referring now to FIG. 3A, shown is a sequence 300 for moving a data block, in accordance with one or more embodiments. In one or more embodiments, the sequence 300 may be part of the memory management logic 130 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device.

In one or more embodiments, the sequence 300 may be an exemplary expansion of step 260 shown in FIG. 2. Thus, in some embodiments, the sequence 300 may be performed in the event that a first data block is read from a far memory (i.e., step 250 shown in FIG. 2). For the sake of illustration, the steps involved in the sequence 300 may be described below with reference to FIG. 3B, which shows an example of a data block move in accordance with some embodiments. However, the scope of the various embodiments discussed herein is not limited in this regard.

At step 310, a first data block is moved from the far memory to a fill buffer. For example, referring to FIG. 3B, the first data block 370 is moved from the far memory 120 to the fill buffer 136 (indicated by arrow 362).

At step 320, a second data block is moved from the near memory to a drain buffer. For example, referring to FIG. 3B, the second data block 380 is moved from the near memory 112 to the drain buffer 138 (indicated by arrow 364). In one or more embodiments, the second data block may be included within the same set as the first data block. Stated differently, in some embodiments, the location swap between the far memory 120 and the near memory 112 may be limited to two ways and one set.

At step 330, the first block is moved from the fill buffer to the near memory. For example, referring to FIG. 3B, the first data block 370 is moved from the fill buffer 136 to the near memory 112 (indicated by arrow 366). In some embodiments, the first data block 370 is moved into the storage location formerly occupied by the second data block 380 (i.e., prior to step 320).

At step 340, the second block is moved from the drain buffer to the far memory. For example, referring to FIG. 3B, the second data block 380 is moved from the drain buffer 138 to the far memory 120 (indicated by arrow 368). In some embodiments, the second data block 380 is moved into the storage location formerly occupied by the first data block 370 (i.e., prior to step 310).

At step 350, metadata associated with the first and second blocks may be updated. For example, referring to FIGS. 1B and 3B, the metadata entries MD may be updated to reflect the new storage locations of the first data block 370 and the second data block 380.

At step 360, the tag cache may be updated to include a tag associated with the first block. For example, referring to FIGS. 1A and 3B, the tag cache 132 may be updated to include a tag associated with the first data block 370. Note that, in some embodiments, the tag cache 132 is to store tags associated with all data blocks stored in the near memory 112. After step 360, the sequence 300 ends.

Figure 3B:
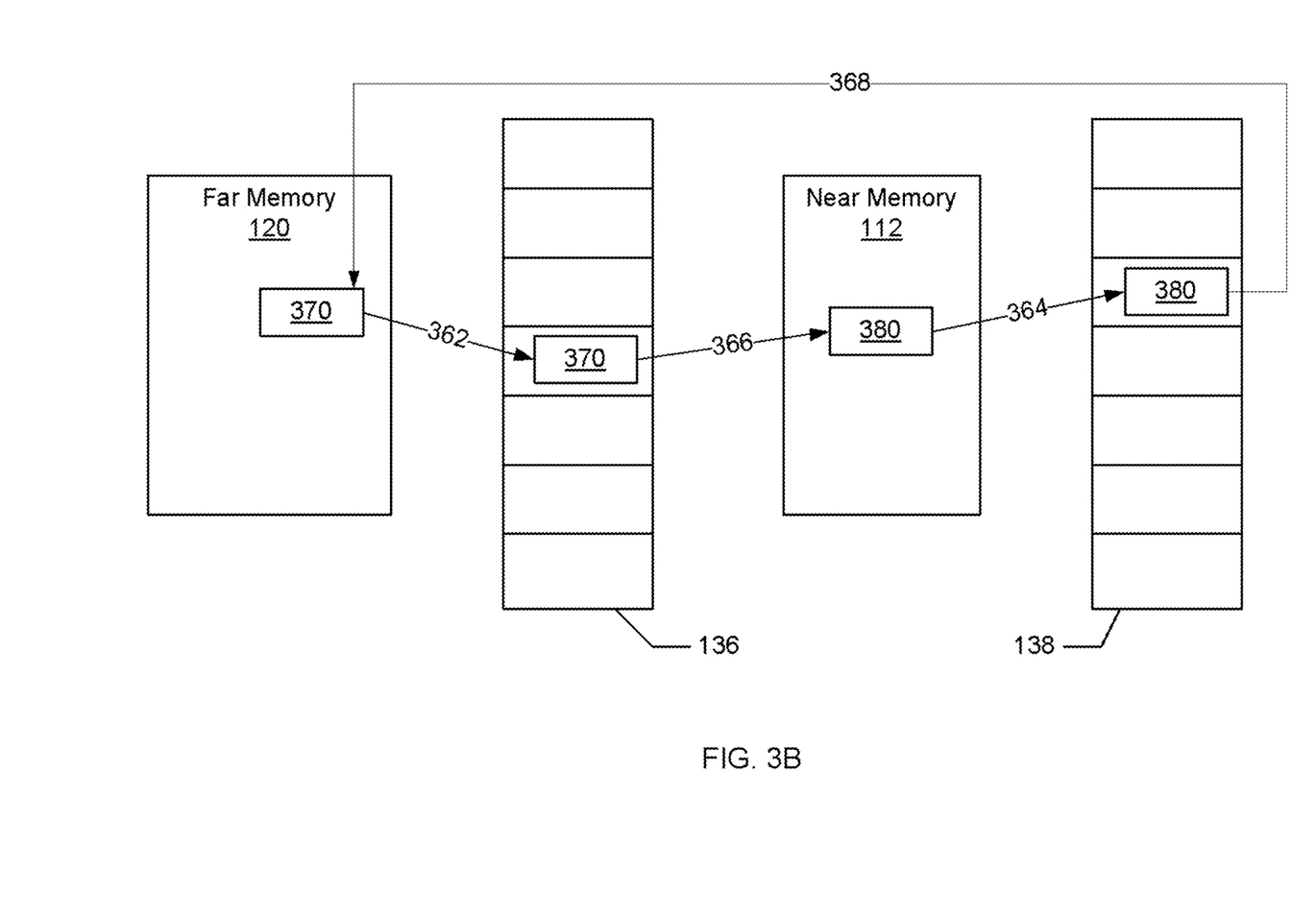
FIG. 3B is an example of a data block move in accordance with one or more embodiments.

Optionally, in some embodiments, the sequence 300 may be modified to omit the use of either the fill buffer 136 or the drain buffer 138. For example, in embodiments not using the fill buffer 136, step 310 may be omitted, and step 330 may include moving the first data block 370 directly from the far memory 120 to the near memory 112. In another example, in embodiments not using drain buffer 138, step 340 may be omitted, and step 320 may include moving the second data block 380 directly from the near memory 112 to the far memory 120.

Note that the examples shown in FIGS. 1A-1C, 2, and 3A-3B are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). It is also contemplated that some embodiments may include any number of components other than those shown, and that different arrangements of the components shown may occur in certain implementations. Further, it is contemplated that specifics in the examples shown in FIGS. 1A-1C, 2, and 3A-3B may be used anywhere in one or more embodiments.

Figure 4:
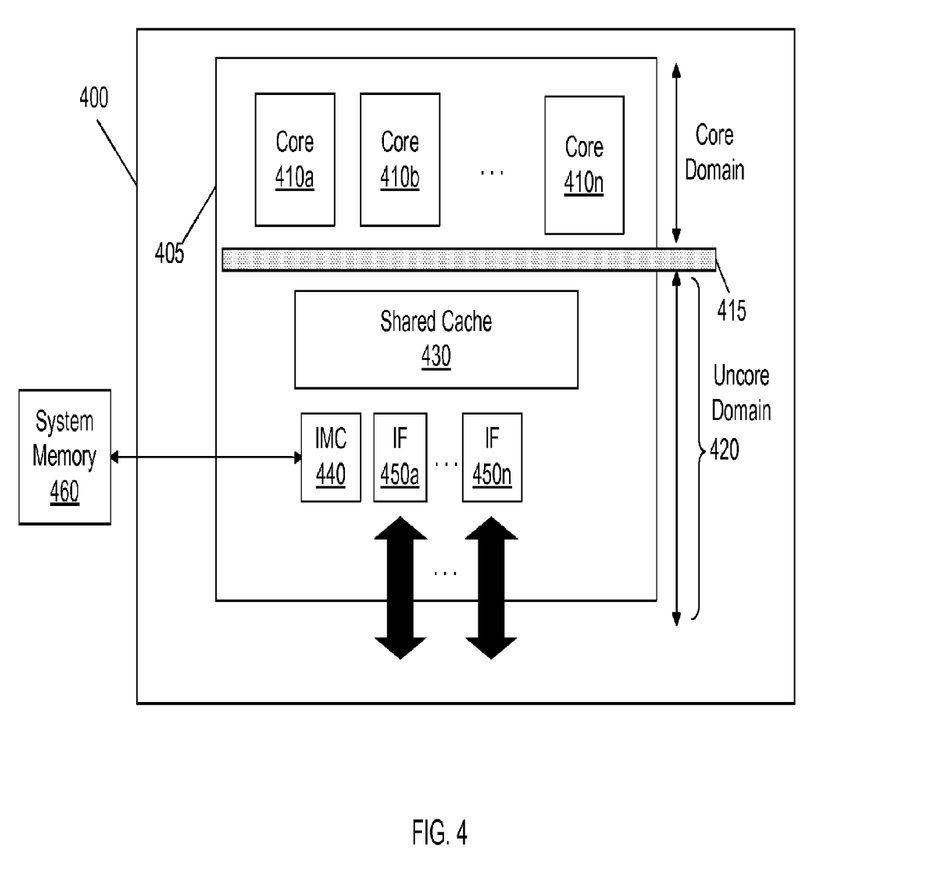
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache (LLC). In addition, the uncore domain may include an integrated memory controller (IMC) 440 and various interfaces (I/Fs) 450.

Although not shown for ease of illustration in FIG. 4, in some embodiments, each of the cores 410a-410n may include the memory management logic 130 shown in FIG. 1A Alternatively, in some embodiments, some or all of the memory management logic 130 may be included in the uncore domain 420, and may thus be shared across the cores 410a-410n.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
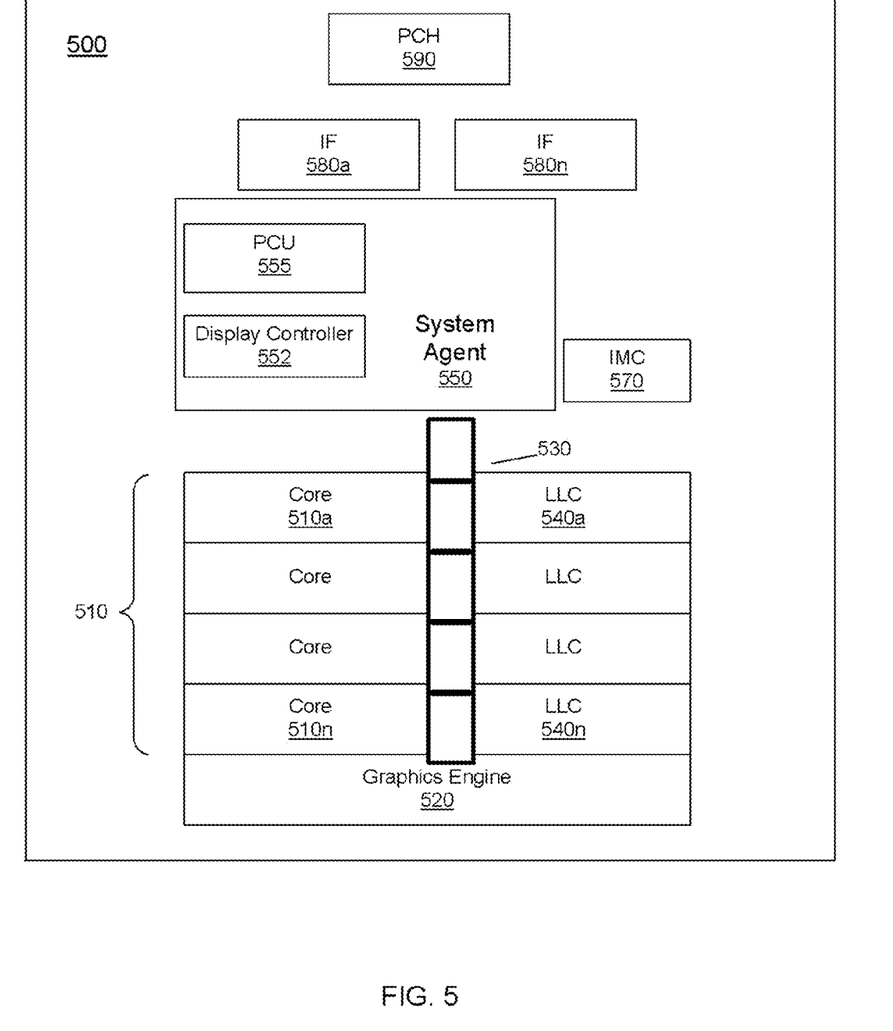
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Although not shown for ease of illustration in FIG. 5, in some embodiments, each of the cores 510a-510n can include the memory management logic 130 shown in FIG. 1A. Note that while only three domains are shown, embodiments are not limited in this regard, and additional domains can be present in other embodiments. For example, multiple core domains may be present each including at least one core.

In general, each core 510a-510n may further include low level caches in addition to various execution units and additional processing elements. In turn, the various cores may be coupled to each other and to a shared cache memory formed of a plurality of units of a last level cache (LLC) 540a-540n. In various embodiments, the LLC may be shared amongst the cores and the graphics engine, as well as various media processing circuitry. As seen, a ring interconnect 530 thus couples the cores together, and provides interconnection between the cores, graphics domain 520 and system agent domain 550. In the embodiment of FIG. 5, system agent domain 550 may include display controller 552 which may provide control of and an interface to an associated display. As further seen, system agent domain 550 may also include a power control unit 555 to allocate power to the central processing unit (CPU) and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, embodiments are not limited in this regard.

Figure 6:
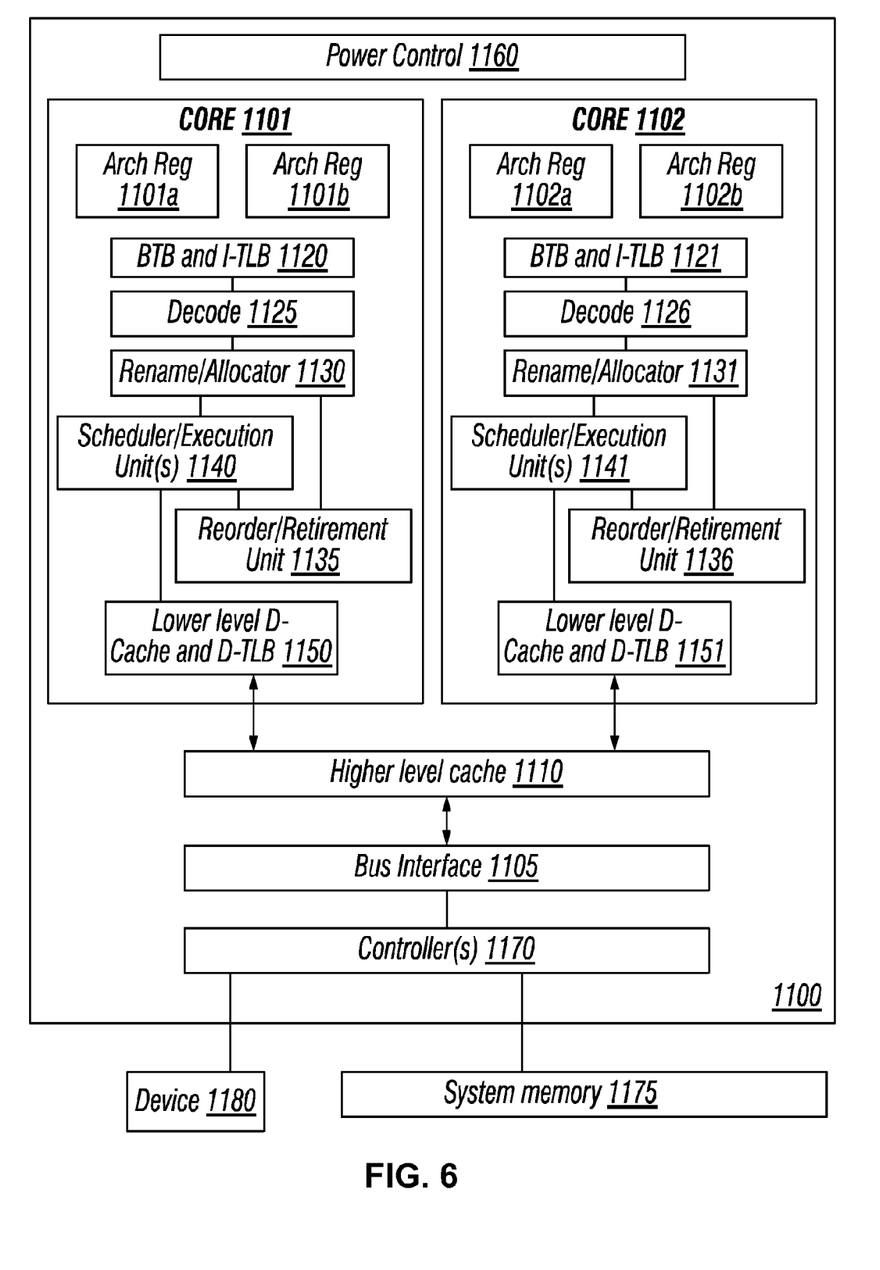
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 can include the memory management logic 130 shown in FIG. 1A.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, logical processors, threads, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, instruction-translation lookaside buffer (I-TLB) 1120, load/store buffers, and queues may be shared through partitioning. Other resources, such as general purpose internal registers, page-table base register(s), low-level data-cache and data-TLB 1150, scheduler/execution unit(s) 1140, and portions of reorder/retirement unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer (BTB) to predict branches to be executed/taken and an instruction-translation lookaside buffer (I-TLB) 1120 to store address translation entries for instructions.

Core 1101 further includes decode module 1125 coupled to fetch logic to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., the actions shown in FIGS. 2 and 3A). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Block 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operations on execution units. For example, a floating point instruction is scheduled on a port of an execution unit that has an available floating point execution unit. Register files associated with the execution units are also included to store instruction processing results. Exemplary execution units include a floating point execution unit, an integer execution unit, a jump execution unit, a load execution unit, a store execution unit, and other known execution units.

Lower level data cache and data translation lookaside buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or include an instruction cache. A trace cache—a type of instruction cache—instead may be coupled after decode logic 1125 to store recently decoded traces.

In the depicted configuration, processor 1100 also includes bus interface 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an input/output (I/O) controller hub to connect peripheral devices), a memory controller hub, a Northbridge, or other integrated circuit. And in this scenario, bus 1105 may include any known interconnect, such as a multi-drop bus, a point-to-point interconnect, a serial interconnect, a parallel bus, a coherent (e.g. cache coherent) bus, a layered protocol architecture, a differential bus, and a Gunning Transceiver Logic (GTL) bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphics accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, a controller 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics device 1180. Yet, in the SOC environment, even more devices, such as the network interface, co-processors, memory 1175, graphics device 1180, and any other known computer devices/interface may be integrated on a single die or integrated circuit to provide a small form factor with high functionality and low power consumption.

Figure 7:
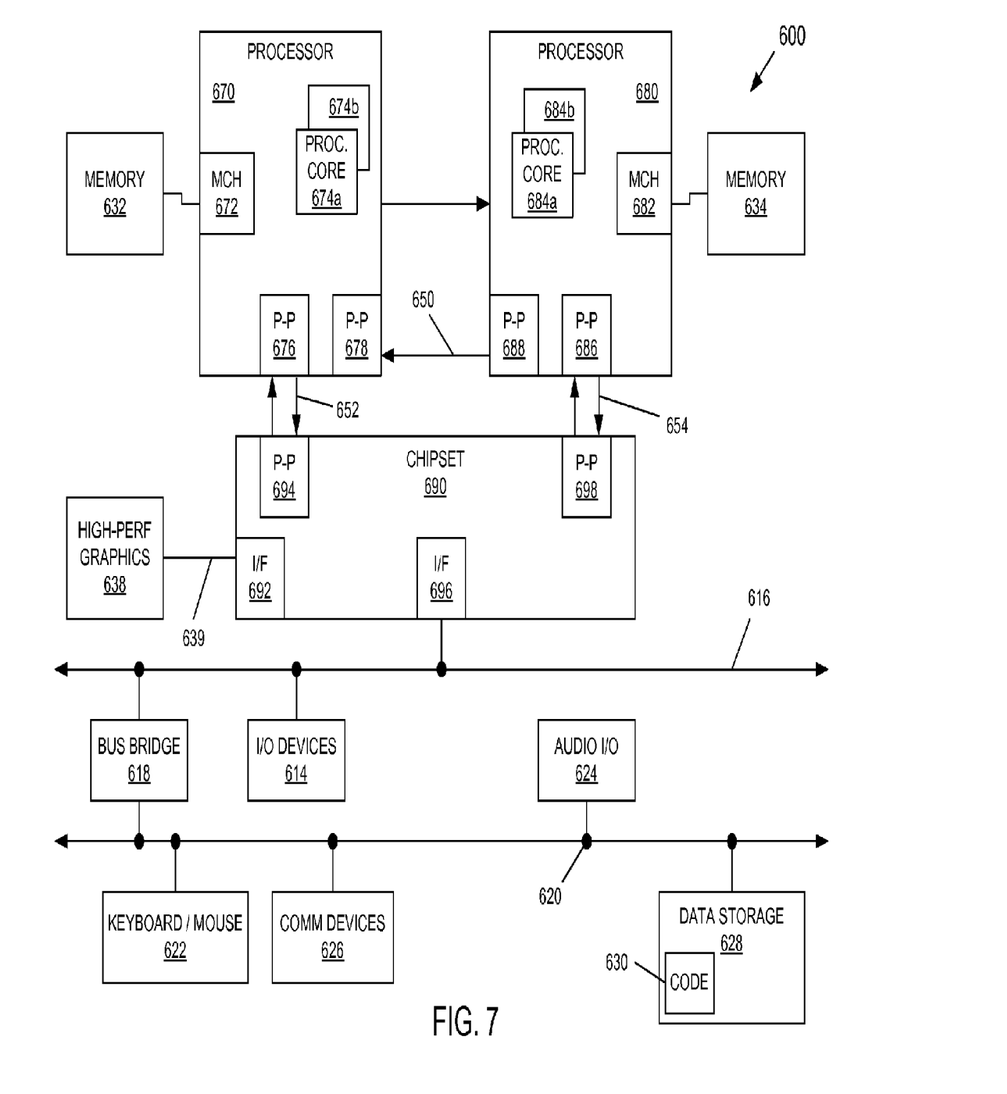
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors 670 and 680 may include the memory management logic 130 shown in FIG. 1A.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, complementary metal-oxide-semiconductor (CMOS), Bipolar CMOS (BiCMOS), or n-channel metal-oxide semiconductor (NMOS).

It is contemplated that the processors described herein are not limited to any system or device. Other system designs and configurations known in the arts for laptops, desktops, handheld personal computers (PCs), personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a processor including at least one execution unit, a near memory, and memory management logic. The memory management logic may manage the near memory and a far memory as a unified exclusive memory, where the far memory is external to the processor. The unified exclusive memory space may be divided into a plurality of locations, where the plurality of locations may be arranged in a plurality of sets and a plurality of ways. The memory management logic may, in response to a request for a first data block stored in the far memory, move the first data block from a first location in the far memory to a second location in the near memory. The processor may further include a fill buffer to store the first data block during a transfer from the first location to the second location. The memory management logic may also move a second data block from the second location in the near memory to the first location in the far memory. The processor may also include a drain buffer to store the second data block during a transfer from the second location to the first location. The processor may also include a tag cache to store tags associated with data blocks stored in the near memory. The processor may also include a tag buffer to store tags associated with data blocks being moved between the near memory and the far memory.

Another example embodiment may be a system including a far memory and a processor coupled to the far memory. The processor may include a near memory and memory management logic. The memory management logic may manage the near memory and the far memory as a unified exclusive memory space, where the unified exclusive memory space is divided into a plurality of locations, each of a plurality of data blocks to be exclusively stored in the far memory or the near memory. Each of the plurality of locations may be associated with a unique memory address. The memory address may include a tag portion, a set portion, and an offset portion. The near memory may include a first plurality of ways and a plurality of sets. The far memory may include a second plurality of ways and the plurality of sets. A first way of the near memory may store a plurality of metadata entries. Each of the plurality of metadata entries may correspond to a unique one of the plurality of locations.

Yet another example embodiment may be a method, including: determining, by a processor, whether a requested data block is stored exclusively in a near memory of the processor. The method may also include, upon determining that the requested data block is not stored exclusively in the near memory: determining a first location of a far memory storing the requested data block; and moving the requested data block from the first location of the far memory to a second location of the near memory, where the far memory is external to the processor. Moving the requested data block from the first location of the far memory to the second location of the near memory may include: moving the requested data block from the first location of the far memory to a fill buffer; and moving the requested data block from the fill buffer to the second location of the near memory. The method may also include: moving a second data block from the second location of the near memory to a drain buffer; and moving the second data block from the drain buffer to the first location of the far memory. The method may also include updating a tag cache to include a tag associated with the requested data block. The method may also include, upon determining that the requested data block is stored exclusively in the near memory, reading the requested data block from the near memory. Determining the first location of the far memory storing the requested memory block may include reading metadata stored in a first way of the near memory. Determining whether the requested data block is stored exclusively in the near memory of the processor may include checking a tag cache for a tag associated with the requested data block. Determining whether the requested data block is stored exclusively in the near memory of the processor may also include reading metadata stored in a lowest way of the near memory.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
   at least one execution unit;
   a near memory; and
   memory management logic to manage the near memory and a far memory as a unified exclusive memory space divided into a plurality of locations,
   wherein the plurality of locations is arranged in a plurality of sets and a plurality of ways,
   wherein the plurality of ways includes ways numbered from 1 to W,
   wherein the near memory includes locations associated with all of the plurality of sets and a first portion of the plurality of ways,
   wherein the first portion of the plurality of ways includes ways 1 to N,
   wherein the far memory is external to the processor and includes locations associated with all of the plurality of sets and a second portion of the plurality of ways,
   wherein the second portion of the plurality of ways includes ways (N+1) to W,
   wherein N and W are integer numbers,
   wherein N is less than W and N is greater than 1, and
   wherein, for each set of the plurality of sets, a way having a lowest way address of the plurality of ways stores metadata including tags associated with all remaining ways.

2. The processor of claim 1, wherein:
   each of the plurality of locations is associated with a unique memory address comprising a tag portion, a set portion, and an offset portion.

3. The processor of claim 1, wherein the memory management logic is further to, in response to a request for a first data block stored in the far memory:
   move the first data block from a first location in the far memory to a second location in the near memory; and
   move a second data block from the second location in the near memory to the first location in the far memory.

4. The processor of claim 3, further comprising a fill buffer to store the first data block during a transfer from the first location in the far memory to the second location in the near memory.

5. The processor of claim 3, further comprising a drain buffer to store the second data block during a transfer from the second location in the near memory to the first location in the far memory.

6. The processor of claim 3, further comprising a tag buffer to store a first tag associated with the first data block while the first data block is moved from the first location in the far memory to the second location in the near memory, and to store a second tag associated with the second data block while the second data block is moved from the second location in the near memory to the first location in the far memory.

7. The processor of claim 1, further comprising a tag cache to store tags associated with data blocks stored in the near memory.

8. A system comprising:
   a far memory;
   a processor, coupled to the far memory, including:
      a near memory; and
      memory management logic to manage the near memory and the far memory as a unified exclusive memory space,
      wherein the unified exclusive memory space is divided into a plurality of locations,
      wherein the plurality of locations is arranged in a plurality of sets and a plurality of ways,
      wherein the plurality of ways includes ways numbered from 1 to W,
      wherein the near memory includes all of the plurality of sets and a first portion of the plurality of ways,
      wherein the first portion of the plurality of ways includes ways 1 to N,
      wherein the far memory includes all of the plurality of sets and a second portion of the plurality of ways,
      wherein the second portion of the plurality of ways includes ways (N+1) to W,
      wherein N and W are integer numbers,
      wherein N is less than W,
      wherein each of a plurality of data blocks is to be stored in either the far memory or the near memory, and
      wherein, for each set of the plurality of sets, a way having a lowest way address of the plurality of ways stores a metadata entry describing data blocks stored in the remaining ways.

9. The system of claim 8, wherein each of the plurality of locations is associated with a unique memory address.

10. The system of claim 9, wherein the unique memory address comprises a tag portion, a set portion, and an offset portion.

11. The system of claim 8, wherein the far memory is a main memory of the system.

12. The system of claim 8, wherein, for each set of the plurality of sets:
   the metadata entry includes tags associated with the remaining ways.

13. A method, comprising:
   determining, by a processor, whether a requested data block is stored in a near memory of the processor;
   upon determining that the requested data block is not stored in the near memory of the processor:
      determining a first location in a far memory storing the requested data block; and moving the requested data block from the first location in the far memory to a second location in the near memory, wherein the near memory and the far memory are addressed as a unified exclusive memory space arranged in a plurality of sets and a plurality of ways, wherein the plurality of ways includes ways numbered from 1 to W, wherein the near memory includes locations associated with all of the plurality of sets and a first portion of the plurality of ways, wherein the first portion of the plurality of ways includes ways 1 to N, wherein the far memory is external to the processor and includes locations associated with all of the plurality of sets and a second portion of the plurality of ways, wherein the second portion of the plurality of ways includes ways (N+1) to W, wherein N and W are integer numbers, wherein N is less than W, wherein determining the first location in the far memory storing the requested data block comprises reading metadata entries stored in a first way of the near memory, wherein the first way has a lowest way address of the plurality of ways.

14. The method of claim 13, wherein moving the requested data block from the first location in the far memory to the second location in the near memory comprises:

moving the requested data block from the first location in the far memory to a fill buffer; and moving the requested data block from the fill buffer to the second location in the near memory.

15. The method of claim 14, further comprising:

moving a second data block from the second location in the near memory to a drain buffer; and moving the second data block from the drain buffer to the first location in the far memory.

16. The method of claim 14, further comprising:

updating a tag cache to include a tag associated with the requested data block.

17. The method of claim 13, further comprising:

upon determining that the requested data block is stored in the near memory, reading the requested data block from the near memory.

18. The method of claim 13, wherein determining whether the requested data block is stored in the near memory of the processor comprises checking a tag cache for a tag associated with the requested data block.

19. The method of claim 18, wherein determining whether the requested data block is stored in the near memory of the processor further comprises reading metadata entries stored in a first way of the near memory, wherein the first way has a lowest way address of the plurality of ways.

* * * * *